(12) United States Patent  
Mäder (10) Patent No.: US 10,364,104 B2  
(45) Date of Patent: Jul. 30, 2019

(54) TRANSFER SYSTEM WITH A PUSHING DEVICE FOR PIECE OBJECTS

(71) Applicant: WRH Walter Reist Holding AG, Ermatingen (CH)

(72) Inventor: Carl Conrad Mäder, Hittnau (CH)

(73) Assignee: WRH WALTER REIST HOLDING AG, Ermatingen (CH)

( * ) Notice: Subject to any disclaimer, the term of this patent is extended or adjusted under 35 U.S.C. 154(b) by 0 days.

(21) Appl. No.: 15/668,815

(22) Filed: Aug. 4, 2017

(65) Prior Publication Data

US 2018/0044120 A1 Feb. 15, 2018

(30) Foreign Application Priority Data

Aug. 10, 2016 (CH) ...................................... 1029/16

(51) Int. Cl.
 *B65G 47/84* (2006.01)
 *B65G 43/08* (2006.01)
 (Continued)

(52) U.S. Cl.
 CPC ........... *B65G 47/844* (2013.01); *B65G 43/08* (2013.01); *B65G 47/53* (2013.01); *B65G 47/82* (2013.01);
 (Continued)

(58) Field of Classification Search
 CPC .................................................... B65G 47/844
 (Continued)

(56) References Cited

U.S. PATENT DOCUMENTS

| 4,227,607 A | 10/1980 | Malavenda |
| 4,530,199 A * | 7/1985 | Manservisi ........... B07C 5/3412 |
| | | 209/536 |

(Continued)

FOREIGN PATENT DOCUMENTS

| DE | 1185538 | 1/1965 |
| DE | 1202722 | 10/1965 |

(Continued)

OTHER PUBLICATIONS

Switzerland Search Report dated Oct. 18, 2016, Application No. 01029/16, 2 pages.

(Continued)

*Primary Examiner* — Gene O Crawford  
*Assistant Examiner* — Lester III Rushin  
(74) *Attorney, Agent, or Firm* — Rankin, Hill & Clark LLP (57) ABSTRACT

A transfer system for piece objects includes a pushing device and a main conveyor with a conveying region. The pushing device includes first and second pushing members. The transfer system includes a supply zone, which is behind the conveying region in a pushing direction. In an initial position of the pushing device, the first pushing member is between the conveying region and the supply zone and the second pushing member is behind the supply zone in the pushing direction. In an end position of the pushing device, the first pushing member is in front of the conveying region in the pushing direction and the second pushing member is between the conveying region and the supply zone. The first pushing member, between the initial position and the end position, is at a fixed spacing to, and in front of, the second pushing member in the pushing direction.

17 Claims, 5 Drawing Sheets

(51) Int. Cl.
*B65G 47/53* (2006.01)
*B65G 47/82* (2006.01)

(52) U.S. Cl.
CPC .... *B65G 47/841* (2013.01); *B65G 2203/0208* (2013.01)

(58) Field of Classification Search
USPC .............................................. 198/464.1, 846
See application file for complete search history.

(56) References Cited

U.S. PATENT DOCUMENTS

| | | |
|---|---|---|
| 7,007,792 B1 | 3/2006 | Burch |
| 8,371,568 B2 * | 2/2013 | Herrmann ............ B65H 29/242 270/52.14 |

FOREIGN PATENT DOCUMENTS

| | | |
|---|---|---|
| DE | 39 16 424 | 11/1990 |
| DE | 10 2007 018 676 | 10/2008 |
| EP | 0 084 763 | 8/1983 |
| EP | 0 391 301 | 10/1990 |
| EP | 0 623 535 | 11/1994 |
| EP | 1 900 638 | 3/2008 |
| GB | 2 098 567 | 11/1982 |
| JP | 5-254650 | 10/1993 |
| WO | 99/12664 | 3/1999 |
| WO | 2014/013478 | 1/2014 |

OTHER PUBLICATIONS

Extended European Search Report dated Jan. 9, 2018, Application No. 17 18 4409, 11 pages.

\* cited by examiner

Fig.7

TRANSFER SYSTEM WITH A PUSHING DEVICE FOR PIECE OBJECTS

BACKGROUND OF THE INVENTION

Field of the Invention

The invention relates to the field of transfer systems with a pushing device for the transfer of piece objects onto a conveyor, as well as to the field of methods for the transfer of piece objects onto a conveyor by a pushing device.

Description of Related Art

Amongst other things, conveyors are used for conveying piece objects. The transfer of piece objects onto the conveyor in order to convey them with the conveyor over a predefined stretch is a commonly known procedure. Various devices and systems already exist for this. Pushing procedures and pushing devices for the transfer onto the conveyor are widespread in the case that the piece object is connected to the conveyor essentially by way of static friction and thus by way of a pressing force upon the conveyor. Here, pushers are used and these transfer the piece object onto the conveyor by way of the piece object being pushed onto the conveying surface of the conveyor. Such a transfer system is known for example from EP 0 391 301 A1.

With each pushing procedure, the known pushers are at risk of pushing the piece object which is to be transferred to the conveyor, into a piece object, which is already located on the conveyor. These pushers, after they have transferred the piece objects onto the container and are to be moved out of a conveying region of the conveyor again, can also collide with piece objects, which are located on the conveyor. Here, the piece object, the pushing device, the conveyor and/or other parts of the transfer system or parts of devices surrounding the transfer system can become damaged. The conveying by the conveyor can be disrupted or even prevented.

With known pushers, the piece object must mostly be pushed between piece objects, which are already located on the conveyor. For this, the conveyor must be moved accordingly slowly or possibly even temporarily braked and/or distances between piece objects on the conveyor need to be selected in a suitably large manner. The utilisation and conveying capacity of the conveyor can therefore be reduced. Moreover, the conveyor and the pushers need to be controlled and monitored in a precise manner. This is cumbersome, complicated and technically difficult.

SUMMARY OF THE INVENTION

It is therefore the object of the invention to provide a transfer system and a method for the transfer of piece objects onto a conveyor of the initial mentioned type, the system and method at least partly overcoming at least one of the disadvantageous mentioned above.

These objects are achieved by a transfer system and a method with the subsequently described features.

What is suggested here is a transfer system for piece objects which includes a pushing device and a main conveyor with a conveying region. Here, the pushing device includes at least one first pushing member and a second pushing member, and the transfer system includes a supply zone, which is behind the conveying region in the pushing direction. In an initial position of the pushing device, the first pushing member is arranged between the conveying region and the supply zone in the pushing direction and the second pushing member is arranged behind the supply zone in the pushing direction. In an end position of the pushing device, which is arranged in front of the initial position in the pushing direction, the first pushing member is arranged in front of the conveying region in the pushing direction and the second pushing member is arranged between the conveying region and the supply zone in the pushing direction. In this manner, given a movement of the pushing device from the initial position to the end position, piece objects can be transferred from the supply zone to the conveying region and piece objects can be taken away from the conveying region. In the pushing device, the first pushing member between the initial position and the end position is arranged in a fixedly distanced manner to the second pushing member and moreover arranged in front of the second pushing member in the pushing direction, so that each movement of the first pushing member on a path from the initial position to the end position effects the same movement of the second pushing member.

The pushing device is therefore designed in a manner such that given a pushing movement of the pushing device from the initial position to the end position, the first and the second pushing member simultaneously undergo a movement, by way of which on the one hand piece objects can be taken out of the conveying region away from the main conveyor by way of the first pusher and on the other hand piece objects can be transferred from the supply zone onto the main conveyor (expressed more precisely into the conveying region) by way of the second pusher. The transfer system by way of the one pushing movement of the pushing device therefore permits a transfer of piece objects onto the main conveyor and a pushing of piece objects away from the main conveyor.

Here, the two piece objects do not collide with one another since the first pushing member in the initial position is arranged between the piece object in the conveying region and the piece object in the supply zone and remains between the two piece objects even during the pushing movement. The first pushing member therefore separates a piece object, which is to be transferred to the main conveyor, from piece objects, which are in the conveying region and which can possibly be taken away from the main conveyor.

In particular, the first pushing member is arranged between two adjacent piece objects, and the second pushing member is arranged at an opposite side of one of these two adjacent piece goods.

In particular, the first pushing member and the second pushing member are adjacent. In other words, a space between the first pushing member and the second pushing member is free of further pushing members.

The pushing device thus includes two pushing spaces, which are arranged successively in the pushing direction and which are separated from one another by the first pushing member. The piece objects each remain in these pushing spaces during the pushing movement and can be pushed relative to the main conveyor in a manner spatially separated from one another.

The transfer system thus prevents piece objects, which are to be transferred to the main conveyor, from colliding with a piece objects, which are already located in the conveying region of the main conveyor. This is due to the fact that piece objects, which are possibly situated in the conveying region, are pushed away from the main conveyor by the first pushing member. Space is created for the piece objects (to be transferred to the main conveyor) in this manner.

The danger of a collision of the pushing device with the subsequent piece objects, which are already located on the main conveyor, is reduced since an already existing distance between piece objects, which are successive on the main conveyor, is not reduced by a replacement of a piece object at one location. In this case, the pushing device could be provided with enough space and time so as not to collide with other piece objects in the conveying region.

Damage to the piece objects, pushing device, conveyor and/or other parts of the transfer system or parts of the devices surrounding the transfer system can be avoided by way of the above described device and the associated method. The conveying can also be continued in an undisrupted manner even with a transfer of piece objects onto the main conveyor.

Neither do the piece objects need to be inserted into a gap between piece objects already located on the main conveyor. One can make do without a large gap or wide distances between adjacent piece objects. With small distances between the piece objects, the main conveyor can be operated at a non-braked speed despite the transfer of piece objects to the main conveyor. A monitoring and control of the transfer system can also be designed and carried out in a simpler manner thanks to the inventive pushing device with the two pushing members. In particular, one can completely forgo the monitoring and the control of the transfer system. This simplifies the transfer system, renders it robust and inexpensive in manufacture and operation.

If, given the same pushing movement of the pushing device, on the one hand a first piece object is taken away from the main conveyor by the first pushing member and on the other hand a second piece object is transferred from the supply zone onto the main conveyor by the second pushing member, then the second piece object replaces the first piece object in the conveying region of the main conveyor. The second piece object after the replacement is thus placed and conveyed further at essentially the same location in the conveying region, as was the case with the first piece object before the replacement.

The replacement of piece objects on the main conveyor by the pushing device has the advantage that the main conveyor is maximally utilised. The conveying capacity of the main conveyor can be utilised to the full extent since no unused space for piece objects arises in the conveying region. In other words, it is not the case that piece objects are firstly taken from the main conveyor, empty spaces are then conveyed further in the conveying region and only later are they filled by way of the transfer of piece objects onto the main conveyor, but piece objects are transported at an optimal distance to one another up to the pushing device and there are replaced by other piece objects, wherein the optimal distance between the piece objects on the main conveyor is retained. The utilisation of the main conveyor and the efficiency of the transfer system are increased by way of this.

The same main conveyor can be used for a towards-conveying (incoming conveying) and an away-conveying (outgoing conveying) to and from a given location by way of the replacement of the piece objects. The number of conveyors can therefore be reduced. The replacement permits a simple, parallel loading and unloading of the main conveyor in a single pushing movement, thus in a single working step, and with only a single pushing device. One can make do without a separate unloading (taking-away from the main conveyor) and loading (transferring to the main conveyor) of piece objects by different devices and/or in different working steps. The replacement of piece objects on the main conveyor simplifies the transfer system, renders it robust and inexpensive in construction and operation.

A replacement of piece objects is particularly efficient in the case of main conveyors, which convey piece objects to processing zones and also away from these again. For example, the same main conveyor can convey empty containers (which can also be considered as piece objects) to a filling station where these containers are filled and as full containers are transferred to the main conveyor again by way of the full containers replacing the empty containers. The full containers are then conveyed further by the same main conveyor, which has already conveyed the empty containers to the filling station at the same location of the conveying region.

The main conveyor is a conveyor with a conveying region. The conveying region is a region of the main conveyor, in which the piece objects can be located during the conveying with the main conveyor. The piece objects are held in the conveying region essentially by way of the static friction with the main conveyor. The piece objects thus lie on the main conveyor essentially by way of the pressing force (also called pressure force). This pressing force can include the gravitational force, the weight force and/or the centripetal force. The conveying region of the main conveyor can run essentially horizontally. The piece object can be brought from static friction into sliding friction and be displaced by way of this, by way of a force directed transversely to the pressing force of the piece object.

What is meant by a piece object is an individual, spatial formed object, which is formed separately from a further piece object. Piece objects are sometimes referred to as piece goods or unit loads. The piece objects can be conveyed individually piece by piece. A piece object, for example, is also a vessel whether full or empty. A packaging unit, in particular a tied stack is also a piece object. Crates, boxes, baskets, pockets or other objects, whether of one piece or of several pieces and put together, whether empty or partly or completely filled, are piece objects.

The pushing device is designed for pushing piece objects. The pushing device includes at least one first and a second pushing member. A pushing member is a device element that is designed to push piece objects. The pushing member can exert a force upon the piece object, in order to bring the piece object out of static friction with the main conveyor into a sliding friction and to move it, which is to say displace it by way of this.

A pushing member can push the piece objects in a non-positive manner. In particular, a pushing member includes a stop for the piece object, in order to move the piece object in a manner arranged on the stop with a contact fit by way of moving the pushing member and in order to push the piece object by way of this.

A pushing member can optionally also exert a force upon the piece objects by way of electromagnetic fields, magnetic fields, electrical fields, fluid delivery such as a directed compressed air delivery or other physical effects, in order to push the piece objects.

The pushing direction of the pushing device is the direction, in which the piece object is pushed on moving the pushing device (and by way of this also the first and second pushing member) from the initial position into the end position. In particular, the pushing direction is formed as a straight line and points from the initial position to the end position of the pushing member of the pushing device.

The supply zone is a region of the transfer system, in which piece objects are provided in order to be transferred to the main conveyor by the second pushing member. The supply zone is therefore arranged in front of the second pushing member and behind the first pushing member in the pushing direction, when the pushing device is situated in the initial position. The supply zone can be provided with piece objects in a manual, semi-automatic or automatic manner.

Further embodiments can include the following optional features. Here, the features of the method claims where appropriate can be combined with those of the device claims and vice versa.

Optionally, the pushing direction of the pushing device is arranged obliquely to a conveying direction of the main conveyor.

Obliquely means that the pushing direction intersects the conveying direction. The pushing direction is therefore arranged obliquely to the conveying direction and crosses the conveying direction. An oblique arrangement of the pushing direction and the conveying direction permits a simple and rapid transfer of piece objects onto the conveyor.

Oblique, for example, can also be understood in that the pushing direction to the conveying direction differs maximally by 45 degrees from a right-angled arrangement. In particular, the pushing direction to the conveying direction differs from a right-angled arrangement by maximally 30 degrees. The pushing direction to the conveying direction can differ from a right-angled arrangement also by maximally 15 degrees.

In particular, the pushing direction of the pushing device is arranged at right angles to the conveying direction of the main conveyor.

As an optional feature, the supply zone is arranged in a conveying region of an incoming conveyor.

The supply zone can be encompassed by a conveying region of an incoming conveyor. The supply zone can be simply and efficiently supplied by an incoming conveyor. An incoming conveyor can be designed as a conveyor. An incoming conveyor can also be designed as a lift. The incoming conveyor can also have a circulating conveying path. The incoming conveyor can also have an open conveying path with end points. The incoming conveyor can move piece objects to and fro along the same conveying path. The incoming conveyor can also convey piece objects in only one direction along the same conveying path. The incoming conveyor can provide the supply zone with piece objects in a manually controlled, semi-automatically controlled or fully-automatically controlled manner.

Alternatively, the supply zone can be free of an incoming conveyor. The supply zone can also be formed next to an incoming conveyor.

Optionally, an incoming conveying direction of the incoming conveyor is arranged essentially at right angles to the conveying direction of the main conveyor, in a region between the initial position and the end position of the second pushing member.

The incoming conveying direction indicates the conveying direction of the incoming conveyor. The piece objects are conveyed in the incoming conveying direction into the supply zone by the incoming conveyor.

What is meant by a region between the initial position and end position of the second pushing member is a region of the incoming conveyor and of the main conveyor, in which piece objects arranged thereon can be pushed by the second pushing member given the pushing movement from the initial position to the end position.

For example, a direction points essentially in a reference direction if the direction does not differ from the reference direction by more than maximally 30 angle degrees. In particular, this means that the direction does not differ from the reference direction by more than 15 angle degrees. The direction differs from the reference direction for example by not more than maximally 5 angle degrees, in order to be essentially the same.

For example, the incoming conveying direction is essentially perpendicular to the conveying direction of the main conveyor as well as essentially perpendicular to the pushing direction of the pushing device.

For example, the incoming conveying direction is essentially perpendicular to the conveying direction of the main conveyor and essentially parallel to the pushing direction of the pushing device.

Optionally, the incoming conveying direction of the incoming conveyor is arranged essentially opposite to the conveying direction of the main conveyor, in a region between the initial position and the end position of the second pushing member.

As an optional feature, the incoming conveying direction of the incoming conveyor is arranged essentially parallel to the conveying direction of the main conveyor, in a region between the initial position and the end position of the second pushing member.

The pushing device optionally includes a closed circulatory path, along which the at least two pushing members are moved. A part of this circulatory path, which lies between the initial position and the end position, is free from intersection points with the remaining circulatory path.

In other words, the pushing device includes a closed circulatory path for the pushing members, the path being able to be run through by the pushing members in the same circulatory direction, in order to get from the initial position into the end position and thereafter back into the initial position. Here, the pushing members on their way back from the end position into the initial position do not cross the path which the pushing members take in the pushing movement from the initial position to the end position. In this manner, the pushing members can be moved from the end position back into the initial position, without them thereby possibly colliding with piece objects in the conveying region and/or in the supply zone.

Alternatively, the pushing device includes a closed circulatory path for the pushing members, with which the path of the pushing movement and the path from the end position back to the initial position cross one another. The pushing device can also include an open circulatory path with end points.

The pushing members can be moved to and fro along the same circulatory path. The pushing members can also be moved along the same circulatory path also only in one direction.

As an optional feature, the transfer system includes a continuous drive for the pushing device. In particular, the transfer system includes a sequential drive for the pushing device.

A continuous drive for the pushing device can be manufactured and operated in a simple and stable manner. A sequential drive can be simply controlled/activated and applied in a targeted manner.

Alternatively, the transfer system can drive the pushing device by way of a drive that is outside the transfer system. For example, the pushing device can be driven by the same drive as the main conveyor (this drive can be encompassed by the transfer system or be arranged outside the transfer system). The pushing device, for example, can also be driven by an incoming conveyor or its drive.

The transfer system optionally includes a control means for the pushing device and a size detection means for piece objects in the conveying region of the main conveyor. Here, the control means is provided with size information from the size detection means. The control means is capable of selectively activating a movement of the pushing device whilst taking into account this size information.

The size detection means is capable of determining size information of the piece objects. The size information includes details on the physical extension of the piece object, thus on the size of the piece object. The size information includes at least one piece of information on at least one spatial dimension. The size information can include information on the size of the piece object in two spatial dimensions. In particular, the size information includes size information on the size of the piece object in three dimensions.

The size information can be determined by the size detection means by way of measuring the piece object with a measuring means of the size detection means.

Additionally or alternatively, the size detection means can identify the piece object with an identification means of the size detection means, for instance by way of a bar code on the piece object, a recognition per radio signal with the piece object or by way of communication with a process control which monitors the piece objects on the main conveyor, and by way of enquiring the identification from the process control, for determining the size information. After the identification, the size detection means can fall back on the provided size information of piece objects and can provide the size information which is assigned to the identified piece object.

The control means is designed to control the pushing movement of the pushing device. Here, the control means can fall back on the size information of the size detection means and initiate or not a pushing movement of the pushing device on the basis of the size information. The pushing movement can be initiated by the control means if a minimum size for a piece object according to the size information is exceeded. Or the pushing movement is initiated for example if a size of a piece object according to size information lies between a minimum size and a maximal size. Or the pushing movement can be initiated by the control means if no size information is present and for example no piece objects are expected in the conveying region.

The pushing movement can be activated in a targeted manner in this way, in order for example to replace a selected piece object by a certain piece object in a targeted manner. A piece object can also be transferred into gaps between other piece objects. The utilisation of the main conveyor can be increased according to requirements in this manner.

The transfer system optionally includes a control means for the pushing device and a size detection means for piece objects of the supply zone. Here, the control means is provided with size information of the size detection means. The control means is capable of selectively activating a movement of the pushing device whilst taking into account this size information.

Size detection means for piece objects of the supply zone and control means have the same features and advantages as already described above for the size detection of the piece objects in the conveying region.

In particular, the control means can activate the pushing movement when the size information indicates that the piece object in the conveying region has essentially the same size as the piece object in the supply zone.

For this, size information of the piece object in the conveying region as well as size information of the piece object in the supply zone can be present and compared. However, one can also work with only one size recognition means for piece objects in the conveying region, concerning, which, for example, piece objects of a certain size are taken away from the main conveyor by the first pushing member and these piece objects subsequently get into the supply zone. By way of this, it can be ensured that only piece objects of the same size are taken away from main conveyor and/or transferred to the main conveyor. In this manner, in particular it can be ensured that only piece objects of the same size replace one another in the conveying region by way of a pushing movement of the pushing device.

Essentially the same size can mean that the length in one dimension differs from one another maximally by not more than 20%. In particular, it means that the length in one dimension does not differ from one another by more than 10%. The difference from one another for example is not more than maximally 5%.

The transfer system optionally includes a control element, which is designed to change a position of the pushing members relative to the circulatory path.

In particular, the transfer system includes a control element, which is designed as a cam guide (motion link), wherein the cam guide is arranged in a stationary manner relative the circulatory path of the pushing members.

The cam guide can come into a contact fit with a contact element comprised by the pushing member and in this manner deflect the pushing member relative to the circulatory path. The deflecting relative to the circulatory path can be a rotation, for example. The pushing member can be deflected relative to the circulatory path by way of tilting. The deflecting relative to the circulatory path can be a pivoting of the pushing member.

In particular, the piece object can be transferred onto an outgoing conveyor on taking it from the main conveyor by the first pushing member.

With regard to context, the same features and advantages, which have already been described for the incoming conveyor, apply to the outgoing conveyor In particular, an outgoing conveying direction of the outgoing conveyor is arranged essentially at right angles to the conveying direction of the main conveyor, in a region between the initial position and the end position of the first pushing member.

The outgoing conveying direction is to be understood as the conveying direction of the outgoing conveyor. The piece object is conveyed away from the main conveyor in the outgoing conveying direction by the outgoing conveyor.

What is meant by the region between the initial position and the end position of the first pushing member is a region of the main conveyor and of the outgoing conveyor, in which a piece object, which is arranged thereon, can be displaced by the first pushing member with the pushing movement from the initial position to the end position.

For example, the outgoing conveying direction is essentially perpendicular to the conveying direction of the main conveyor as well as essentially perpendicular to the pushing direction of the pushing device.

For example, the outgoing conveying direction is essentially perpendicular to the conveying direction of the main conveyor and essentially parallel to the pushing direction of the pushing device.

Optionally, in a region between the initial position and the end position of the first pushing member, the outgoing conveying direction of the outgoing conveyor is arranged essentially oppositely to the conveying direction of the main conveyor.

As an optional feature, in a region between the initial position and the end position of the first pushing member, the outgoing conveying direction of the outgoing conveyor is arranged essentially parallel to the conveying direction of the main conveyor.

For example, a single conveyor serves as an outgoing conveyor as well as an incoming conveyor. The outgoing conveyor and incoming conveyor are alternatively designed separately.

The invention also includes a method for the transfer of piece objects onto a main conveyor and away from the main conveyor by way of a pushing device, comprising moving the pushing device in a pushing direction of the pushing device from an initial position into an end position, and by way of this, moving a first pushing member of the pushing device and second pushing member of the pushing device, wherein the first pushing member from the initial position to the end position is moved in a fixedly distanced manner to the second pushing member and in a manner arranged in front of the second pushing member, wherein a first piece object is displaced in the pushing direction from a position in the conveying region of the main conveyor into a position outside the conveying region by way of the first pushing member and wherein a second piece object is displaced in the pushing direction from a supply zone outside the conveying region of the main conveyor into a position within the conveying region by the second pushing member, recreating the initial position of the pushing device.

The method can be carried out by the transfer system, which is described above. The optional features, characteristics and advantages, which have all been described for the transfer system accordingly, also apply to the method. The same also applies the other way round.

The replacement of piece objects, which is described above, can be achieved by the method.

Optionally, in the method, the moving of the pushing device from the initial position into the end position can be effected exclusively in the pushing direction in at least one translatory movement. In particular, the pushing device brakes the second piece object, which moves in the pushing direction, in the conveying region.

A device with which only translatory movements are effected in the pushing movement is accordingly designed in a simple and robust manner.

The second piece object can be reliably and securely positioned in the conveying region due to the braking of the piece object in the conveying region by the pushing device. Damage and faulty positioning of the second piece object can be avoided. The braking of the second piece object can be effected by the pushing device when this device is situated in the end position.

As an optional feature, the first pushing member forms a stop for the second piece object, in order to position the second piece object in the conveying region.

Positioning the second piece object in the conveying region by way of a stop on the first pushing member is a simple, robust and inexpensive way of positioning the second piece object in the conveying region.

The second piece object, however, can also be braked by parts of the pushing device other than the first pushing member. The second piece object can even not be braked at all by the pushing device. Or the second piece object can be braked by an element that is different to the pushing device.

Optionally, after the moving of the pushing device from the initial position into the end position, at least one positioning movement of the first pushing member is effected counter to the pushing direction, in order to position the second piece object in the conveying region.

The positioning movement of the first pushing member permits a reliable and secure positioning in a positioning position. Damage to the second piece object and any faulty positioning of this can be avoided. The first pushing member can assume the positioning position by way of the positioning movement and not until afterwards position the second piece object by way of interaction with the piece object, for example by way of a stop. The first pushing member can move the second piece object by way of interaction with the piece object, for example by way of pushing, already during the positioning movement.

During the positioning movement, the second pushing member can be moved in a manner fixedly distanced to the first pushing member, likewise counter to the pushing direction. In particular, the positioning movement includes at least one translatory movement of the first pushing member counter to the pushing direction of the pushing device.

One can also make do without a positioning movement.

As an optional feature, on moving the pushing device from the initial position into the end position, the displacing of the first piece object by the first pushing member is at least partly effected simultaneously with the displacing of the second piece object by the second pushing member.

Expressed differently, the displacing of the first piece object away from the main conveyor and the displacing of the second piece object from the supply zone into the conveying region temporally overlap one another. The pushing device can efficiently replace piece objects in the conveying region in this manner. The transfer system can carry out the necessary movement for displacing the piece object to the main conveyor and away from the main conveyor at least partly simultaneously. This permits a rapid and efficient operation of the transfer device.

Alternatively, the displacing of the first piece object by the first pushing member can be effected in a temporally staggered manner to the displacing of the second piece object by the second pushing member.

Optionally, a size detection means determines size information of the piece object in the conveying region of the main conveyor before the moving of the pushing device from the initial position into the end position, and a control means initiates or skips the moving of the pushing device from the initial position into the end position on the basis of this size information.

Piece objects that are of a certain size in the conveying region can be selectively replaced and/or taken away from the main conveyor in this manner. In particular, the piece objects are replaced by piece objects of the same size.

One can also make do without a size detection in the conveying region.

Optionally, a size detection means determines size information of the piece objects in the supply zone before the moving of the pushing device from the initial position into the end position, and a control means activates or skips the displacing of the pushing device from the initial position into the end position on the basis of this size information.

In the conveying region, piece objects that are of a certain size can be selectively replaced and/or transferred to the main conveyor in this manner. In particular, piece objects are replaced by piece objects of the same size. One can also make do without a size detection in the supply zone.

For example, the transfer system includes size detection means for piece objects in the supply zone and in the conveying region.

BRIEF DESCRIPTION OF THE DRAWINGS

The subject matter of the invention is explained in more detail by way of preferred embodiment examples which are represented in the accompanying drawings. In each case in a schematic manner are shown in.

DETAILED DESCRIPTION OF THE INVENTION

Basically, the same parts are provided in the figures with the same reference numerals. The terms left, right, below and above relate to the plane of the drawing of the figures.

Figure 1:
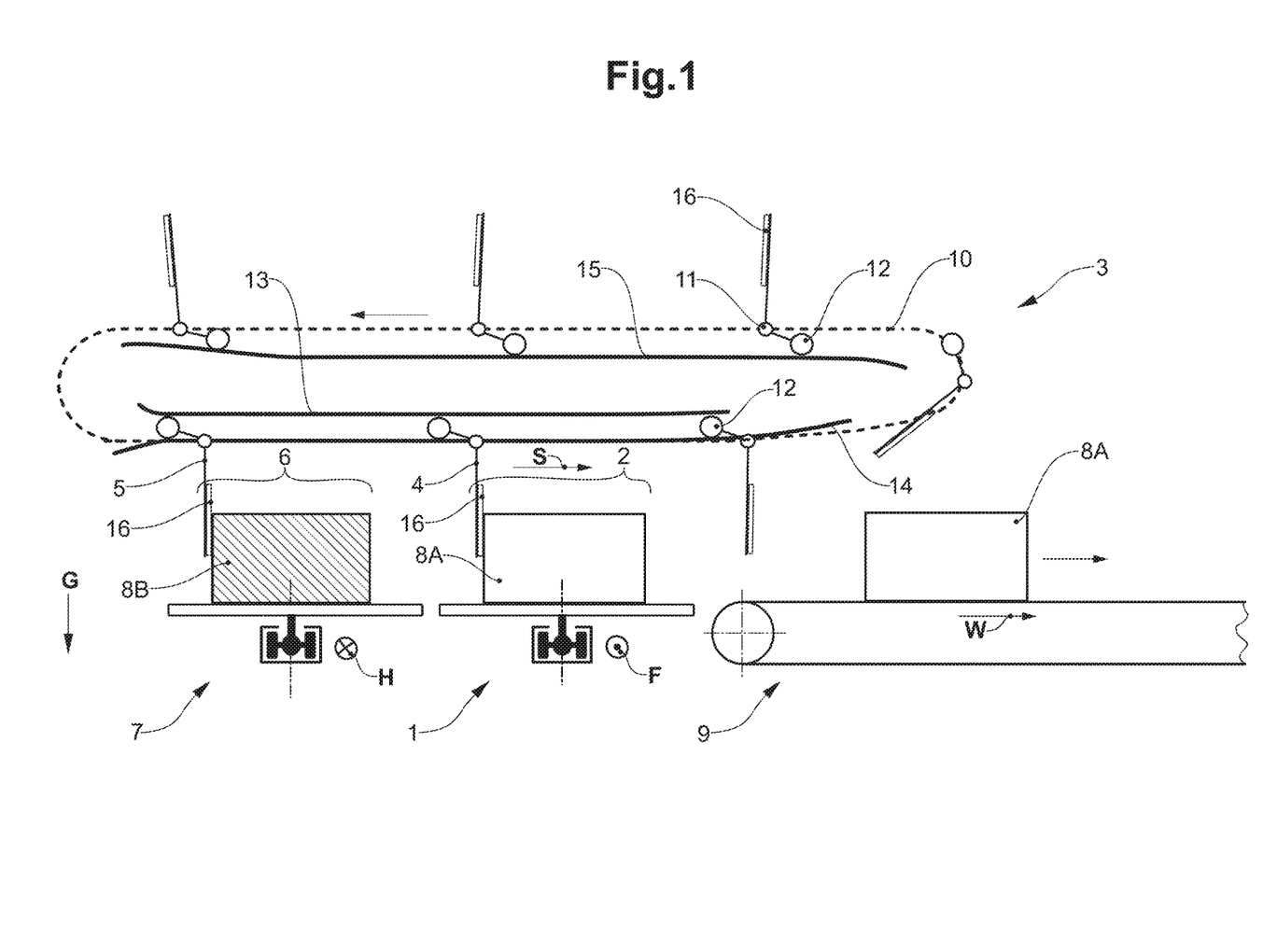
FIG. 1 is a first embodiment of a transfer system with a first pushing device.

FIG. 1 shows a first embodiment of a transfer system with a first pushing device 3. The gravitational direction, which in FIG. 1 points downwards, thus onto the lower edge of FIG. 1 is indicated with G. The main conveyor 1 is a plate chain conveyor, whose conveying direction F is led out perpendicularly to the plane of the drawing towards the viewer. A plate chain conveyor includes plates that are fastened on a conveying chain and on which piece objects can be conveyed. A conveying region 2 is formed on the main conveyor 1. The conveying region 2 is delimited to the bottom by a rest surface of the conveyor 1 and extends laterally almost up to the lateral ends of the rest surface of the main conveyor 1. A piece object 8a, 8b, which is arranged in the conveying region 2 of the main conveyor 1, is held on the main conveyor 1 by way of static friction. The static friction of the piece object 8A, 8B on the main conveyor 1 arises due to the pressing force on account of the weight force of the piece object 8A, 8B in the direction of gravity G.

An incoming conveyor 7, which is likewise designed as a plate chain conveyor, is arranged at the left next to the main conveyor 1. The conveying direction of the incoming conveyor 7 is indicated as the incoming conveying direction H. In the embodiment in FIG. 1, the incoming conveying direction H is directed opposite to the conveying direction F of the main conveyor 1. The incoming conveying direction H of the incoming conveyor 7 therefore points perpendicularly out of the plane of the drawing away from the viewer of FIG. 1. The incoming conveyor 7 and the main conveyor 1 in the front elevation of FIG. 1 are designed analogously and equally large, in other words they have the same cross section transversely to their conveying directions F, H. The incoming conveyor 7 analogously includes an equally large incoming conveying region, which in FIG. 1 is congruent with the supply zone 6. The incoming conveyor 7 supplies the supply zone 6 with a full piece object 8B.

An outgoing conveyor 9, which is also designed as a belt conveyor and whose conveying direction, thus the outgoing conveying direction W runs to the right is arranged to the right next to the main conveyor 1. The outgoing conveying direction W is therefore arranged perpendicularly to the conveying direction F of the main conveyor 1, and by way of this is also perpendicularly to the incoming conveying direction H. All rest surfaces of the three conveyors (main conveyor 1, incoming conveyor 7 and outgoing conveyor 9) lie at the same height, so that a piece object 8A, 8B can each be pushed from one conveyor onto an adjacent conveyor by way of a lateral force.

The pushing device 3 is arranged above the piece objects 8A, 8B which lie on the main conveyor 1 and the incoming conveyor 7, and extends at the same height over the outgoing conveyor 9 roughly by a width of the piece object. The pushing device 3 includes a first pushing member 4, a second pushing member 5 and further pushing members, which are all fastened on a chain 10. The chain 10 conveys all pushing members about a closed circulatory path. This closed circulatory path of the chains 10 includes two sections, which run in a straight line and which are arranged parallel above one another, and deflection regions, which connect these sections. The lower straight section runs parallel to a pushing direction S of the pushing device and conveys all pushing members in the pushing direction S, thus in FIG. 1 from the left to the right. All pushing members are conveyed upwards via the right deflection region of the circulatory path and then to the left along the upper, parallel section of the circulatory path. All pushing members are subsequently conveyed downwards via the left deflection region of the circulatory path to the beginning of the lower parallel section of the circulatory path.

All pushing members of the pushing device 3 of the first embodiment are designed in a constructionally equal manner and include a pushing member joint 11, a cam member 12 and a push plate 16. The pushing member joint 11, the cam member 12 and the push plate 16 are each fastened to the pushing member in a stationary manner and always remain equally arranged relative to one another. The push plate 16 forms a stop for the piece object 8A, 8B on the pushing member. All pushing members are articulately connected to the chain 10 via the pushing member joints 11. The pushing device 3 moreover includes three cam guides, which are installed in a stationary manner: a lower pushing cam guide 14, an upper pushing cam guide 13 and return cam guide 15. With a movement of the pushing members in the push direction S along the lower parallel section of the circulatory path, the cam members 12 of the pushing members can lie from above on the lower cam guide 14 and press from below upon the upper pushing cam guide 13.

In the region where the pushing members are moved in the pushing direction S, the cam members 12 are arranged at an upper left end of the pushing members. In this region, the pushing member joint 11 is arranged to the right below the cam member 12, and the remainder of the pushing member, on which the push plate 16 is fastened, extends below the pushing member joint 11 and perpendicularly downwards. This part of the pushing member, which in this region extends perpendicularly downwards, can come into contact with the piece object 8A, 8B by way of the push plate 16 and can push the piece object 8A, 8B in the push direction S by way of exerting a force in the push direction S. Full piece objects 8B can be transferred from the incoming conveyor 7 onto the main conveyor 1 and empty piece objects 8A be taken away from the main conveyor 1, in this case transferred to the outgoing conveyor 9, in this manner.

The first pushing member 4 is arranged in a fixedly distanced manner to and in front of the second pushing member 5 in the pushing direction S between the initial position and the end position due to the articulated fastening on the chain 10 and due to being held in position by the lower pushing cam guide 14 as well as the upper pushing cam guide 13. In this manner, every movement of the first pushing member 4 on the path from the initial position to the end position effects the same movement of the second pushing member 5.

In FIG. 1, the displacing device 3 is situated between an initial position and an end position. The displacing device 3 is represented just at the beginning of a simultaneous displacing of a first, empty piece object 8A away from the main conveyor 1 onto the outgoing conveyor 9 and a displacing of a second, full piece object 8B from the supply zone 6 into the conveying region 2 of the main conveyor 1. The cam members 12 of the first pushing member 4 and of the second pushing member 5 are limited in their movement over the complete pushing movement of the pushing device 1 from the initial position to the end position, by the lower pushing cam guide 14 and the upper pushing cam guide 13. The lower pushing cam guide 14 aligns the pushing members 4, 5 and the upper pushing cam guide 13 accommodates a force and an impulse, which arise due to the pushing of the piece objects 8A, 8b in the pushing direction S. The return cam guide 15 aligns the pushing members by way of the cam members 12 on recreating the initial position of the pushing device 3.

In FIG. 1, the main conveyor 1 conveys empty piece objects 8A up to the pushing device 3, the pushing direction S of which is arranged at right angles to the conveying direction F of the main conveyor 1. If the empty piece object 8A is arranged at a suitable location below the pushing device 3, then the pushing device 3 begins the pushing movement from the initial position into the end position. The point in time, at which the first pushing member 4 by way of its push plate 16 comes into contact with the empty, first piece object 8A in the conveying region 2 of the main conveyor 1 and the second pushing member 5 by way of its push plate 16 comes into contact with the full, second piece object 8B (represented in a hatched manner) in the supply zone 6 in the conveying region 2 of the incoming conveyor 7 is represented in FIG. 1. The empty, first piece object 8A as well as the full, second piece object 8B still have a static friction with the main conveyor 1 and the incoming conveyor 7 respectively. The pushing of the first piece object 8A from the main conveyor 1 to the outgoing conveyor 9 and the pushing of the second piece object 8B from the supply zone 6 into the conveying region 2 of the main conveyor 1 begins subsequently to this. Once the displacing device 3 has reached its end position, the empty, first piece object 8A in the conveying region 2 of the main conveyor 1 has been replaced by the full second piece object 8B.

Figure 2:
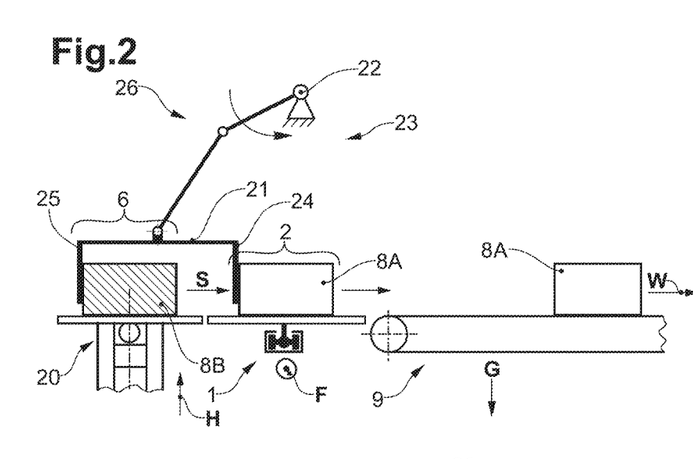
FIG. 2 is a second embodiment of a transfer system with a second pushing device after the beginning of the pushing movement.

A second embodiment of a transfer system with a second pushing device 23 is represented in FIG. 2, as in FIG. 1 likewise after the beginning of a pushing movement. FIG. 2 as FIG. 1 likewise only represents a detail of the complete transfer system. The second embodiment of the transfer system in FIG. 2 differs from the first embodiment of the transfer system in FIG. 1 by a differently designed pushing device 23 and by a different supply of the supply zone 6.

The supply zone 6 in FIG. 2 is supplied by a lift 20 instead of by an incoming conveyor 7 as in FIG. 1. Here, the lift 20 moves full piece objects 8B from the bottom to the top into the supply zone 6. Once the full piece object 8B has been transferred from the second pushing member 25 onto the main conveyor 1 by the pushing movement, the lift 20 moves downwards again, in order to fetch a further full piece object 8B and to bring this upwards again into the supply zone 6.

The pushing device 23 in the second embodiment is designed different from the first embodiment, but the pushing members 4, 5, 24, 25 in both embodiments are basically moved along a closed circulatory path with a similar shape. The circulatory path of the pushing device 23 in the second embodiment thus includes two sections that run in a straight manner and are arranged parallel above one another, and deflecting regions that connect these sections.

Here too, the lower straight section runs parallel to the pushing direction S of the pushing device 24 and transports the pushing members 24, 25 in the push direction S from the initial position into the end position, thus from the left to the right in FIG. 2. Two pushing members 24, 25 are transported upwards via the right deflection region and are then transported to the left along the upper parallel section of the circulatory path. The two pushing members 24, 25 are subsequently transported downwards via the left deflection region of the circulatory path, to the beginning of the lower, parallel section of the circulatory path. The circulatory path for the second embodiment is not drawn for reasons of space. The circulatory path of the second embodiment however can be recognised by the FIGS. 2 to 5. In these, it is always the same view of the second embodiment of the transfer system which is represented, wherein however the pushing device 23 is represented in a temporal sequence in different positions along the circulatory path.

The pushing device 23 includes two pushing members, specifically the first pushing member 24 and the second pushing member 25. These two pushing members 24, 25 are fixedly arranged to one another on a double pusher 21, which is to say are not movable relative to one another, and are moved along the circulatory path. The first pushing member 24 here is arranged on the double pusher 21 to the right of the second pushing member 25, thus in front of the second pushing member 25 in the push direction S. In contrast to the first embodiment, the first pushing member 24 and the second pushing member 25 on their path over the complete circulatory path of the pushing device 23 are arranged in a manner fixedly distanced to one another and pointing in the same direction, specifically with their longitudinal axis arranged parallel to the gravitational direction G. In this manner, each movement of the first pushing member 24 on a path along the complete circulatory path effects the same movement of the second pushing member 25.

In contrast, in the first embodiment in FIG. 1 the pushing members 4, 5 are pivoted relative to the chain 10 on reassuming the initial position after the end position, thus temporarily change their alignment and relative distance to one another.

Each movement of the first pushing member 4 however effects the same movement of the second pushing member 5 at least on a path from the initial position to the end position.

The movement of the double pusher 21 along the circulatory path is effected by way of a crank rod drive 26 which connects the double pusher 21 to a stationary rotation point 22. The crank rod drive 26 is articulately connected to the double pusher 21 so that the pushing member 24 and the second pushing member 25 are each equally aligned at every position of the circulatory path, specifically with their longitudinal axis parallel to the direction of gravity G.

Figure 3:
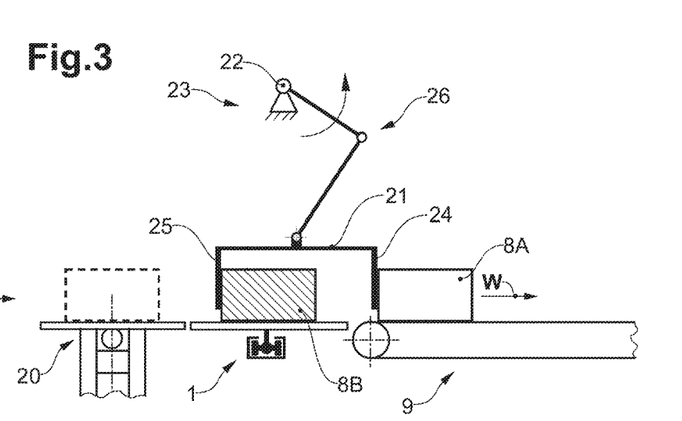
FIG. 3 shows transfer system of FIG. 2 in the end position.

FIG. 3 shows the transfer system of FIG. 2 in the end position. The pushing movement of the pushing device 23 is therefore completed in FIG. 3. The full piece object 8B (represented hatched) has been pushed into the conveying region 2 and has been transferred to the main conveyor 1 and is thus ready for further conveying by the main conveyor 1. The empty piece object 8A which has been conveyed up to the pushing device 23 by the main conveyor is now transferred onto the outgoing conveyor 9 and is therefore located outside the conveying region 2 of the main conveyor 1. The first pushing member 24 is arranged in front of the conveying region 2 in the pushing direction, and the second pushing member 25 is arranged between the conveying region 2 and the supply zone 6 in the pushing direction S.

Figure 4:
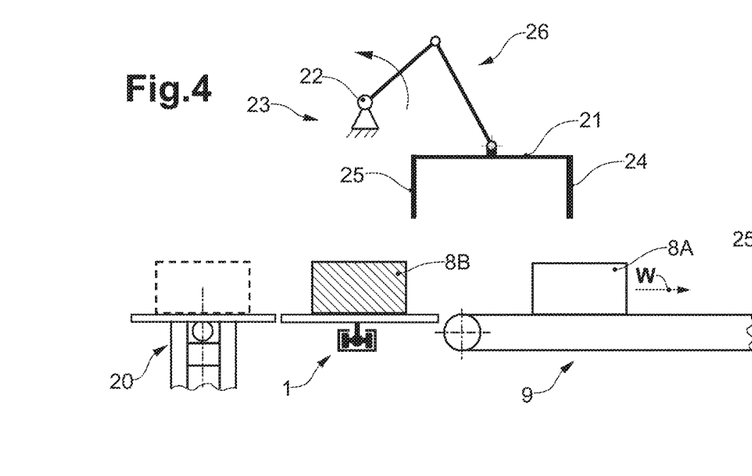
FIG. 4 shows transfer system of FIG. 2 on recreating the initial position.
Figure 5:
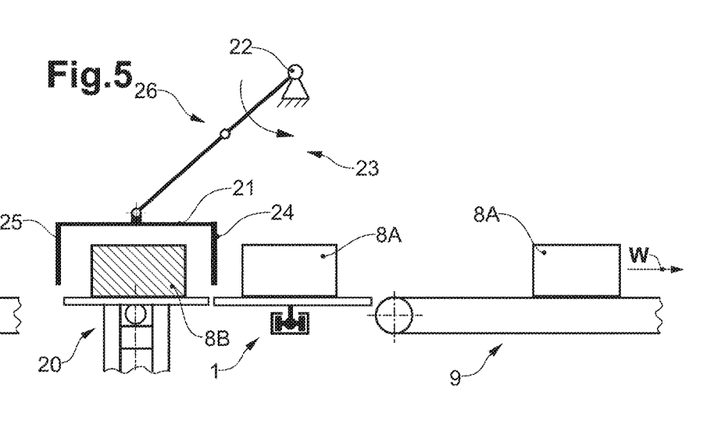
FIG. 5 shows transfer system of FIG. 2 in the initial position.

The same transfer system as is represented in FIG. 2 is represented in FIG. 4, but this time on recreating the initial position. For this, the double pusher 21 is lifted upwards by the crank rod drive 26 and is moved to the left. The main conveyor 1 during this time conveys the full piece object 8B which was previously taken over by the pushing device 23 in FIG. 3, further in the conveying direction F of the main conveyor 1, and the empty piece object 8A which was previously transferred to the outgoing conveyor 9 by the pushing device 23 is conveyed in the outgoing conveying direction W of the outgoing conveyor 9.

FIG. 5 again likewise shows the same transfer system as FIG. 2, and specifically in the initial position. In the meanwhile, an empty piece object 8A is arranged below the pushing device 23, in the conveying region 2 of the main conveyor 1. And the supply zone 6 is supplied with a full piece object 8B by the lift 20. The first pushing member 24 is arranged between the conveying region 2 and the supply zone 6 in the pushing direction S, and the second pushing member 25 is arranged behind the supply zone 6 in the pushing direction S. The pushing movement of the pushing device 23 begins from this situation in the initial position and goes over into the position which is represented in FIG. 2 and in which the piece objects 8A, 8B each come into contact with the first pushing member 24 and the second pushing member 25 and are thereafter pushed to the right in the push direction S.

Figure 6:
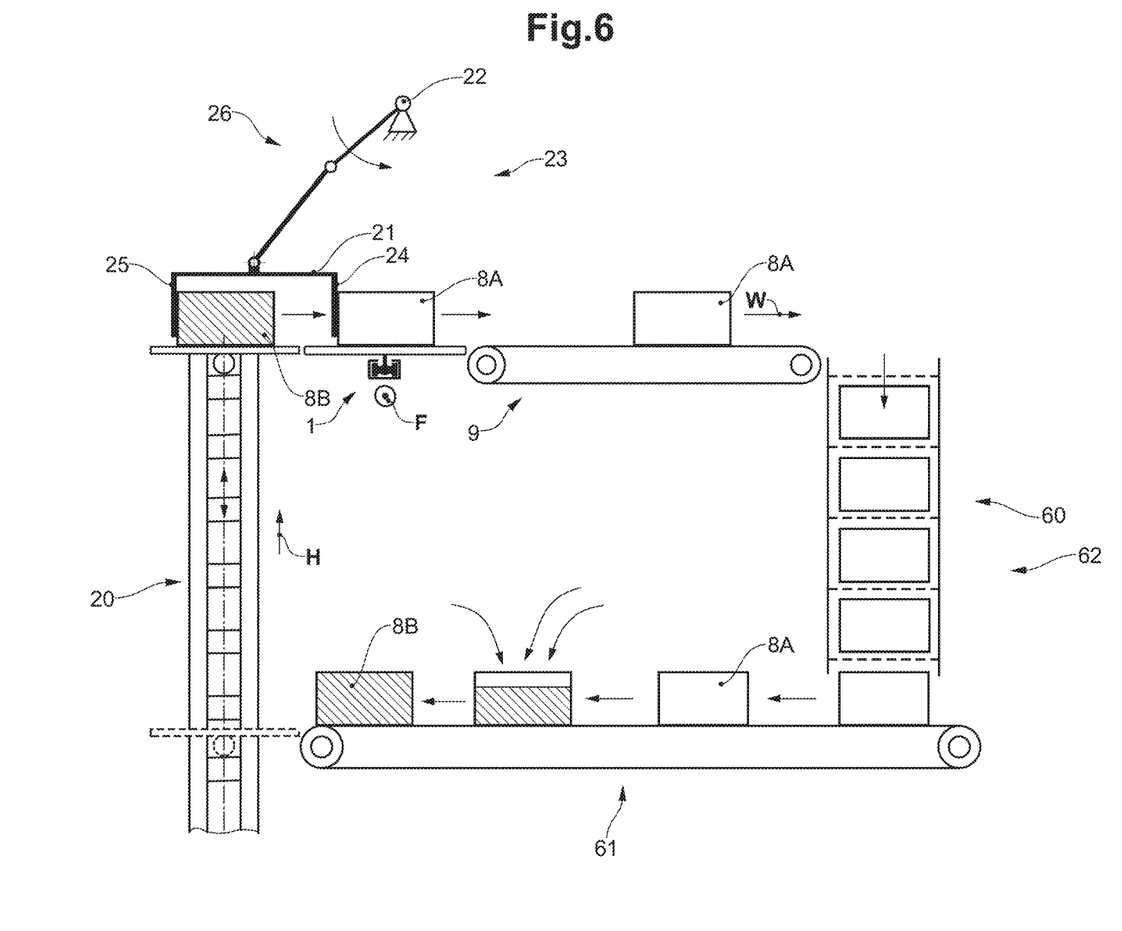
FIG. 6 shows transfer system of FIG. 2 in combination with a processing zone.

FIG. 6 shows the transfer system of FIG. 2 in combination with a processing zone. The transfer device 23 in FIG. 6 is thereby located in the same position in the circulatory path as in FIG. 2. The single difference of FIG. 6 to FIG. 2 is the fact that FIG. 6 shows more than the detail represented in FIG. 2.

An example of a transfer system whose main conveyor 1 conveys piece objects 8A, 8B to a processing zone in the form of a filling station 62 and also away from this again is represented in FIG. 6. The filling station 62 includes a circulating shelf 60 and a filling conveyor 61. The circulating shelf 60 is also called vertical revolving shelf or paternoster shelf and takes an empty piece object BA from the outgoing conveyor 9. The circulating shelf 60 then conveys the empty piece object 8A downwards and transfers it to the filling conveyor 61 which is designed as a belt conveyor. The empty piece objects 8A are conveyed on the filling conveyor 61 from the right to the left to the lift 20. Thereby, the empty piece objects 8A are filled on the filling conveyor 61 (indicated in FIG. 6 by arrow) and reach the lift 20 as full piece objects 8B. As already described, the full piece objects 8B are conveyed into the supply zone 6 with the lift 20.

The same main conveyor 1 therefore conveys empty piece objects 8A (empty crates) to the filling station 62, wherein these piece objects 8A are filled, and as full piece objects 8B (full crates) are transferred by the pushing device 23 again to the main conveyor 1 by way of the full piece objects 8B replacing the empty piece objects 8B at the same location in the conveying region 2. The full piece objects 8B from the filling station 62 are then conveyed further by the same main conveyor 1 which has already conveyed the empty piece objects 8A to the filling station 62.

Figure 7:
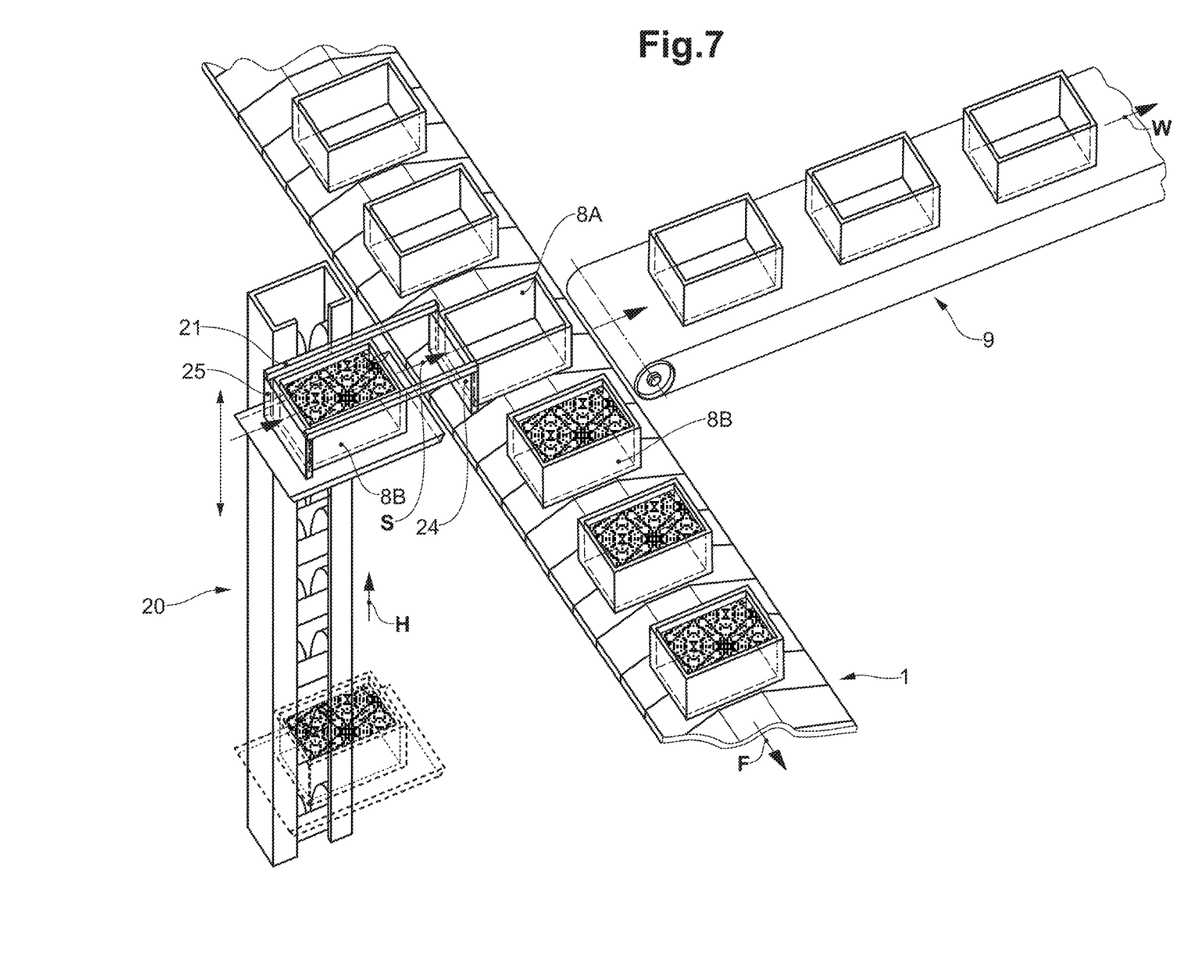
FIG. 7 is a spatial representation of a few elements of FIG. 2.

FIG. 7 is a spatial representation of a few elements of FIG. 2. What is well evident is the constant and uniform utilisation of the main conveyor 1 due to the double pusher 21 of the transfer system with its first pushing member 24 transferring empty piece objects 8A from the main conveyor 1 onto the outgoing conveyor 9 and replacing them with full piece objects 8B. These full piece objects 8B are pushed in the pushing direction S by the second pushing member 25 to the location in the conveying region 2 of the main conveyor 1, the location having previously been occupied by empty piece objects 8A.

Figure 8:
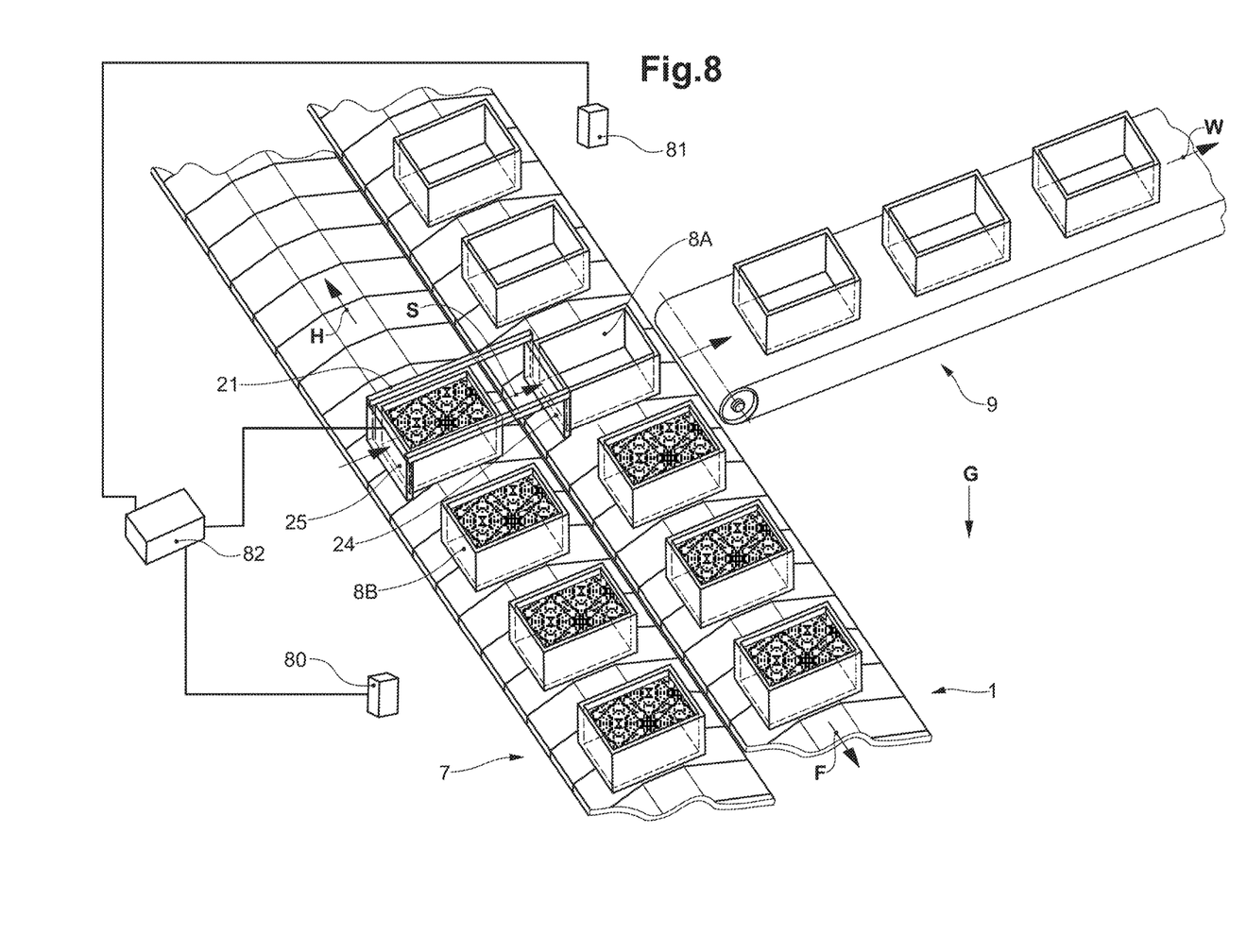
FIG. 8 is a figure analogous to FIG. 7, but with an alternative supply of the supply zone.

FIG. 8 is a figure analogous to FIG. 7 but with an alternative supply of the supply zone 6. Analogously to FIG. 1 in the first embodiment of the transfer system, in FIG. 8 the second embodiment of the transfer system is represented with a supply zone 6, which is supplied by an incoming conveyor 7. The incoming conveyor 7 is designed and arranged analogously to that in FIG. 1. The incoming conveyor 7 is thus arranged parallel to the main conveyor and to the left next to the main conveyor 1 and is designed as a plate chain conveyor. The incoming conveying direction H of the incoming conveyor 7 is opposite to the conveying direction F of the main conveyor 1. The incoming conveyor 7 and the main conveyor 1 are designed analogously and equally large, thus have the same cross section transversely to their conveying directions F, H. The incoming conveyor 7 analogously includes an equally large incoming conveying region and supplies the supply zone 6 with full piece objects 8B.

The transfer system in FIG. 8 moreover includes a size detection means 81 for piece objects 8A in the conveying region 2 of the main conveyor 1. The size detection means 81 determines size information of the empty piece object 8A, before this is conveyed by the main conveyor to the double pusher 21. The size detection means 81 in this example includes a camera, which takes a picture of the empty piece object 8A. The size detection means 81 determines the size information by way of evaluating this picture. The size information is a dimension of the empty piece object 8A from the view of the camera, thus the dimension of the empty piece object 8A on the picture of the camera, which is encompassed by the size detection means 81.

The transfer system in FIG. 8 moreover includes a size detection means 80 for piece objects 8B in the supply zone 6. The size detection means 80 determines the size information of the full piece object 8B on the incoming conveyor 7 before this full piece object 8B is provided by the incoming conveyor 7 in the supply zone 6. The size detection means 80 in this example includes a camera, which takes a picture of the full piece object 8*b* on the incoming conveyor 7. The size detection means 80 determines the size information by way of evaluating this picture. The size information is a dimension of the full piece object 8B from the view of the camera, thus the dimension of the full piece object 8B on the picture of the camera, the camera being encompassed by the size detection means 81.

The size information of the two size detection means 80, 81 is made available to a control means 82. The control means 82 thus has information on the size of the piece objects 8A, 8B, which are located in the conveying region 2 and/or in the supply zone 6 at a given point in time. The control means 82, for example, activates a movement of the double pusher 21 from the initial position into the end position when the size of the empty piece object 8A, which lies in the conveying region 2 and in front of the first pushing member 24 in the pushing direction S corresponds essentially to the size of the full piece object 8B in the supply zone 6. Corresponding essentially to the size here is to be understood as a deviation of the spatial extension in each direction of maximally 10%.

The invention claimed is:

1. A transfer system for piece objects, comprising a pushing device and a main conveyor with a conveying region, wherein said pushing device comprises at least one first pushing member and a second pushing member, and said transfer system comprises a supply zone, which is behind said conveying region in a pushing direction,
   in an initial position of said pushing device, said first pushing member is arranged between said conveying region and said supply zone in said pushing direction, and said second pushing member is arranged behind said supply zone in said pushing direction,
   in an end position of said pushing device, which is arranged in front of said initial position in said pushing position, said first pushing member is arranged in front of said conveying region in said pushing direction and said second pushing member is arranged between said conveying region and said supply zone in said pushing direction, so that given a movement of said pushing device from said initial position to said end position, piece objects can be transferred from said supply zone to said conveying region and piece objects can be taken away from said conveying region,
   in said pushing device, said first pushing member between the initial position and said end position is arranged in a fixedly distanced manner to and in front of said second pushing member in said pushing direction, so that each movement of said first pushing member on a path from said initial position to said end position effects the same movement of said second pushing member.

2. The transfer system according to claim 1, wherein said pushing direction of said pushing device is arranged obliquely to a conveying direction of said main conveyor.

3. The transfer system according to claim 2, wherein said pushing direction of said pushing device is arranged at right angles to said conveying direction of said main conveyor.

4. The transfer system according to claim 1, wherein said supply zone is arranged in a conveying region of an incoming conveyor.

5. The transfer system according to claim 4, wherein an incoming conveying direction of said incoming conveyor is arranged essentially at right angles to said conveying direction of said main conveyor, in a region between said initial position and said end position of said second pushing member.

6. The transfer system according to claim 4, wherein an incoming conveying direction of said incoming conveyor is arranged essentially opposite to said conveying direction of the main conveyor, in a region between said initial position and said end position of said second pushing member.

7. The transfer system according to claim 1, wherein said pushing device comprises a closed circulatory path, along which said at least two pushing members are moved, and a part of said circulatory path which lies between said initial position and said end position is free of intersection points with the remaining circulatory path.

8. The transfer system according to claim 1, wherein said transfer system comprises a continuous drive for said pushing device.

9. The transfer system according to claim 1, wherein said transfer system comprises a controller for said pushing device and a size detector for piece objects in said conveying region of said main conveyor, wherein said controller is provided with size information from said size detector and is capable of selectively activating a movement of said pushing device while taking into account said size information.

10. The transfer system according to claim 1, wherein said transfer system comprises a controller for said pushing device and a size detector for piece objects of said supply zone, wherein said controller is provided with size information from the size detector and is capable of selectively activating a movement of said pushing device while taking into account said size information.

11. A method for the transfer of piece objects onto a main conveyor and away from the main conveyor by way of a pushing device, comprising the steps of:
   moving the said pushing device in a pushing direction of said pushing device from an initial position into an end position, and, by way of this, moving a first pushing member of the pushing device and second pushing member of said pushing device,
      wherein said first pushing member from said initial position to said end position is moved in a manner fixedly distanced to second pushing member and in a manner arranged in front of said second pushing member,
      wherein a first piece object is displaced in said pushing direction from a position in said conveying region of the main conveyor into a position outside conveying region by way of first pushing member, and
      wherein a second piece object is displaced in said pushing direction from a supply zone outside said conveying region of the main conveyor into a position within said conveying region by way of said second pushing member,
   recreating said initial position of said pushing device.

12. The method according to claim 11, wherein moving of said pushing device from said initial position into said end position is effected exclusively in the pushing direction in at least one translatory movement and in particular said pushing device brakes said second piece object, which moves in said pushing direction, in said conveying region.

13. The method according to claim 11, wherein said first pushing member forms a stop for said second piece object, in order to position said second piece object in said conveying region.

14. The method according to claim 11, wherein after moving of said pushing device from said initial position into said end position, at least one positioning movement of said first pushing member is effected counter to said pushing direction, in order to position said second piece object in said conveying region.

15. The method according to claim 11, wherein on moving said pushing device from said initial position into said end position, displacing of said first piece object by said first pushing member is effected at least partly simultaneously with displacing of said second piece object by said second pushing member.

16. The method according to claim 11, wherein a size detector determines size information of said piece objects in said conveying region of said main conveyor before moving of said pushing device from said initial position into said end position, and a controller activates or skips moving of said pushing device from said initial position into said end position based upon the size information.

17. The method according to claim 1, wherein a size detector determines size information of said piece objects in said supply zone before moving of said pushing device from said initial position into said end position, and a controller activates or skips displacing of said pushing device from said initial position into said end position based upon the size information.

* * * * *